(12) United States Patent
Peebles et al.

(10) Patent No.: US 11,874,202 B2
(45) Date of Patent: Jan. 16, 2024

(54) MANAGING ASSETS BY PROCESS VARIABLE MAPPING

(71) Applicant: CONOCOPHILLIPS COMPANY, Houston, TX (US)

(72) Inventors: Robert Peebles, Aberdeenshire (GB); Matthew Thompson, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

(21) Appl. No.: 16/454,303

(22) Filed: Jun. 27, 2019

(65) Prior Publication Data
US 2020/0408644 A1 Dec. 31, 2020

(51) Int. Cl.
*G01M 99/00* (2011.01)
*G06F 11/34* (2006.01)
*G05B 19/418* (2006.01)
*G06Q 10/0635* (2023.01)
*G06F 11/32* (2006.01)
*G06F 11/30* (2006.01)
*G05B 23/02* (2006.01)

(52) U.S. Cl.
CPC ..... *G01M 99/005* (2013.01); *G05B 19/41875* (2013.01); *G05B 23/0272* (2013.01); *G06F 11/3013* (2013.01); *G06F 11/3058* (2013.01); *G06F 11/324* (2013.01); *G06F 11/3409* (2013.01); *G06Q 10/0635* (2013.01)

(58) Field of Classification Search
CPC ............. G01M 99/005; G05B 23/0272; G05B 19/41875; G06F 11/3013; G06F 11/3058; G06F 11/324; G06F 11/3409; G06Q 10/0635

USPC ......................................................... 702/183
See application file for complete search history.

(56) References Cited

U.S. PATENT DOCUMENTS

| | | | |
|---|---|---|---|
| 7,092,771 B2 | 8/2006 | Retlich et al. | |
| 7,346,404 B2 * | 3/2008 | Eryurek | G05B 23/0267 700/32 |
| 8,285,414 B2 * | 10/2012 | Aharoni | G05B 23/0216 409/232 |
| 9,292,792 B1 | 3/2016 | Pedersen et al. | |
| 9,310,790 B2 | 4/2016 | Krishnaswamy et al. | |
| 9,383,901 B1 * | 7/2016 | Dikhit | G06F 11/328 |
| 10,021,125 B2 | 7/2018 | Talamanchi et al. | |

(Continued)

FOREIGN PATENT DOCUMENTS

AU 2016265997 B2 9/2018

OTHER PUBLICATIONS

International Search Report, PCT/US2019/039423, dated Sep. 30, 2019, 2 pgs.

(Continued)

*Primary Examiner* — John H Le
(74) *Attorney, Agent, or Firm* — ConocoPhillips Company

(57) ABSTRACT

Method of condition monitoring an industrial asset is described. The method involves collecting one or more of process variables associated with the industrial asset. Determining abnormal operating conditions for the one or more process variables. Providing a graphic monitoring of the industrial asset, wherein the graphic monitoring visually represents part or portion of the industrial asset operating in abnormal operating conditions.

12 Claims, 2 Drawing Sheets

(56) References Cited

U.S. PATENT DOCUMENTS

| | | | |
|---|---|---|---|
| 2002/0123864 A1* | 9/2002 | Eryurek | G05B 23/0254 |
| | | | 702/188 |
| 2014/0365190 A1* | 12/2014 | Mahate | G06F 30/20 |
| | | | 703/7 |
| 2015/0033084 A1* | 1/2015 | Sasturkar | H04L 41/22 |
| | | | 714/46 |
| 2017/0316357 A1* | 11/2017 | Meganathan | H04L 67/52 |
| 2019/0121350 A1* | 4/2019 | Cella | G01M 13/028 |
| 2020/0327029 A1* | 10/2020 | Prakash | G06F 11/327 |

OTHER PUBLICATIONS

Tian, Guanyu, et al—"Deep Convolutional Neural Networks for Distribution System Fault Classification", 2018, IEEE; 5 pgs.

\* cited by examiner

MANAGING ASSETS BY PROCESS VARIABLE MAPPING

PRIOR RELATED APPLICATIONS

Not applicable.

FEDERALLY SPONSORED RESEARCH STATEMENT

Not applicable.

FIELD OF THE INVENTION

This invention relates to devices and methods for monitoring field assets. More particularly, the present invention provides a scalable real-time visualization of asset performance across a range of process variables.

BACKGROUND OF THE INVENTION

Field Data Capture (FDC) is the gathering and analysis of manually entered or electronically uploaded data (including process variables) from field equipment. In turn, process variables can be used to condition monitor industrial assets. Some industrial facilities can have hundreds if not thousands of metering points for collecting process variables. In these cases, the amount of field data can be overwhelming at least for real-time monitoring purposes. One challenge involves quickly and reliably analyzing the large amount of available field data. Maintenance, operation, and reliability engineers and technicians all depend on condition monitoring to ensure critical equipment operate efficiently and last longer.

SUMMARY OF THE INVENTION

This invention relates to devices and methods for monitoring field assets. More particularly, the present invention provides a scalable real-time visualization of asset performance across a range of process variables.

One example of a method for condition monitoring an industrial asset includes: collecting one or more of process variables associated with the industrial asset; determining abnormal operating conditions for the one or more process variables; and providing a graphic monitoring of the industrial asset, wherein the graphic monitoring visually represents part or portion of the industrial asset operating in abnormal operating conditions.

Another example of a method for condition monitoring an industrial asset includes: collecting one or more of process variables associated with the industrial asset; determining normal or abnormal operating conditions for the one or more process variables; and providing a graphic monitoring of the industrial asset, wherein the graphic monitoring visually represents part or portion of the industrial asset operating in normal or abnormal operating conditions.

Yet another example of a method for condition monitoring an industrial asset includes: collecting a plurality of process variables associated with the industrial asset; determining normal or abnormal operating conditions for the plurality of process variables; and providing a graphic monitoring of the industrial asset, wherein the graphic monitoring visually represents part or portion of the industrial asset operating in normal or abnormal operating conditions.

BRIEF DESCRIPTION OF THE DRAWINGS

The invention, together with further advantages thereof, may best be understood by reference to the following description taken in conjunction with the accompanying figures by way of example and not by way of limitation, in which.

DETAILED DESCRIPTION OF THE INVENTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

Although, the present invention specifically describes monitoring reliability/status of industrial assets found in oil and gas industry, this is not intended to be limiting. The methods and systems described herein can be applied to be any compatible industrial assets. As used herein, the term "industrial asset" refers to any piece of equipment, facility, hardware, software, element, and/or any group of thereof assembled to form a unit. Examples of oil and gas industrial assets include, but are not limited to, production plants, refineries, offshore drilling platforms, wellhead platform, and the like.

There are many aspects of condition monitoring including, but not limited to, gathering field data, analyzing the field data, and generating visual representation that summarizes the field data. It is important to make a full use of available field data to identify intervention opportunities. As used herein, the term "field data" refers to any observable and/or measurable process variable related or associated with operability of the industrial asset. Examples of field data include, but are not limited to, pressure, temperature, flow, position, level, speed, load, differential pressure, and the like.

One of the goals of the present invention is to improve uptime and/or reduce maintenance activities surrounding industrial assets. The present invention provides methods and systems for monitoring industrial assets by providing an immediate and intuitive visual representation based on live data analysis. Live data refers to field data that is relevant for condition monitoring. Live data analysis examines process variable data and reports its findings in real-time or near real-time which gives users the ability to view trends and be alerted to events as they happen.

The visualization can be scaled (e.g., color-coded heat map) to represent normal versus abnormal operating conditions so that identification of anomalous events can be quickly made. The visual representation can be an aggregate single view that is scalable across different assets and a range of process variables. Conventionally, operators rely on multiple visualizations when monitoring numerous process variables.

Figure 1:
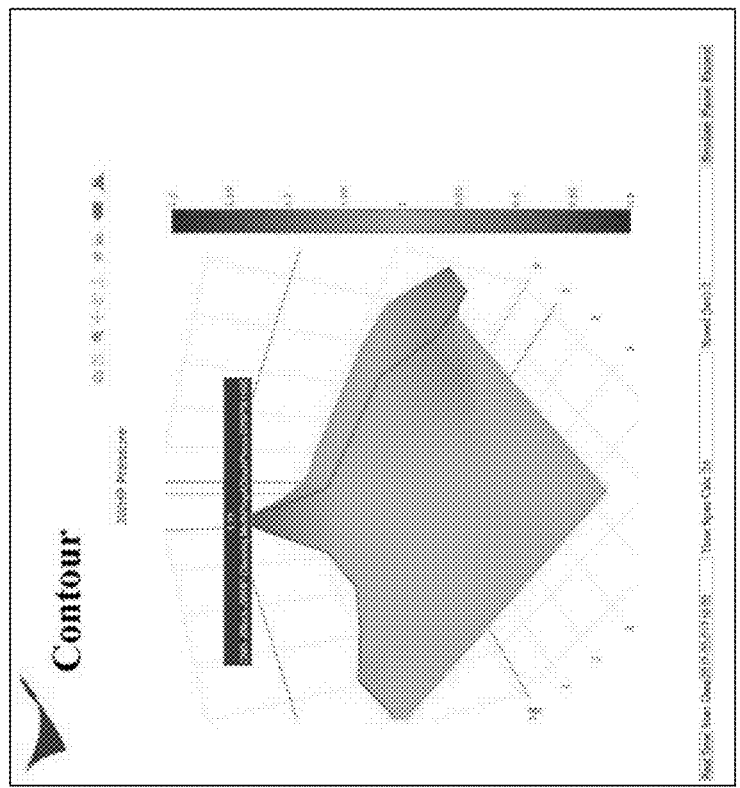
FIG. 1 is a heat map of a facility.
Figure 1:
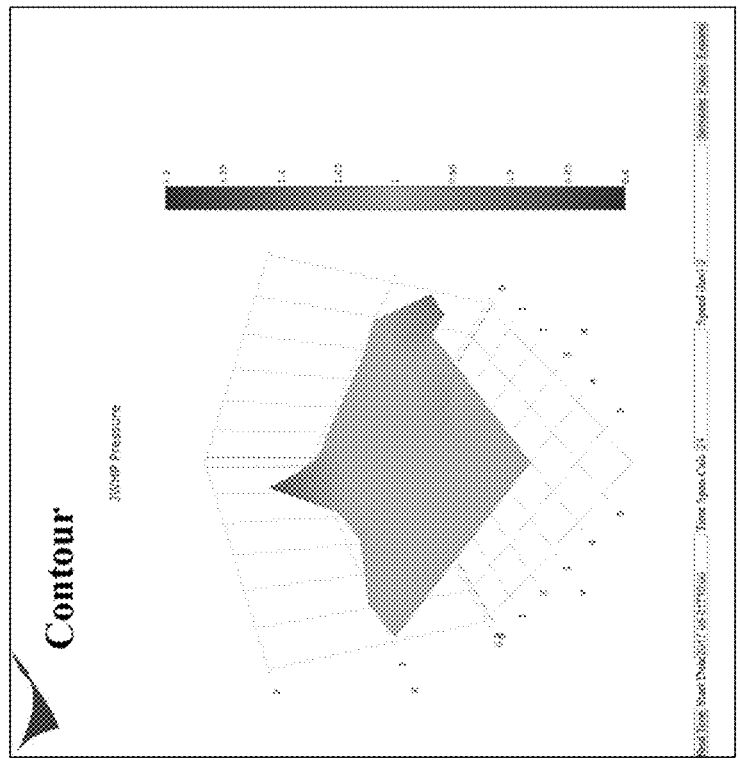

FIG. 1 illustrates an example of a single color-coded heat map of an industrial asset based on a plurality of process variables. This is a pressure map of a wellhead platform that shows operating pressures from all systems varying over time. The color coding and numbering indicate variance in system pressures on a percentage basis over a 24 hr period. The green color indicates a stable pressure reading and the color will change to red when the pressure reading varies. The control buttons for this figure show how the mapping can be based on live or historical data and that the frequency of sampling can be varied to provide greater levels of discrimination.

The normal and abnormal operating conditions can be determined by any compatible method. One approach involves utilizing historical basis. This involves mathematical manipulation of data to examine collective and individual averages and deviations. Normal operating conditions can be determined by analyzing historical process variable values. Typically, the user can define bounds of the historical basis. For example, the user can utilize process variable data obtained during any defined period (e.g., past 24 hours, past 3 days, past week, 3 weeks to 2 weeks, etc.). The user may also define a certain range of process values that generate warnings prior to reaching abnormal levels. For a given visualization, each process variable can be scaled similarly. For example, normal operating conditions for pressure and temperature can be color coded green. Abnormal operating conditions can be color coded red. Values in between normal and abnormal conditions will be an appropriate gradient.

The mathematical calculation is based on timestamped recorded values of a device for a given period. All the values are grouped together then a time-weighted average is produced for a user selectable time period. In this case we have selected a 24 hour period. Device data is not recorded in a constant manor therefore time weighted average is required over a standard average calculation. Using a time-weighted average allows an accurate baseline to be used. The current real-time values are divided by the output to provide a comparable value. The value is then placed within the calculated grid of the map. This provides a visual overview with clear comparable indicators across the map.

Advantages of the present invention include, but are not limited to, enhanced reliability of industrial assets based upon a maturing use of available data, new and additional equipment performance insights towards early failure detection, reduction of maintenance man-hours, and increase in uptime. Additional advantages include confidence that changes in maintenance schedules are not detrimental to asset performance through continuous monitoring of fundamental operating parameters;
early identification of changing process patterns which may lead to corrective maintenance;
predictive analysis and machine learning opportunities;
determination of equipment failure rates from live performance data which can be used for ongoing maintenance optimization (this would include some safety instrumented system (SIS) instrumentation which would be used to support safety integrity level (SIL) calculations and ratings and may also provide an opportunity for reduced safety instrumented function (SIF) testing)
identification of individual instrument failures so that appropriate actions, both operational and maintenance, may be taken Other advantages will be apparent from the disclosure herein.

According to one or more embodiments, the present invention provides systems and methods for collating and evaluating real-time reliability activities to determine a live data analytics approach. This involves reviewing ongoing reliability activities to identify where the use of live data analysis methods may be employed to enhance these and developing new live data analytic approaches utilizing equipment diagnostics and process variables. Once all the reliability activities being performed are understood, the areas of opportunity to introduce live data analysis methods can be identified. New live data analytics approaches can then be developed to include available diagnostic and process variable data.

In one embodiment, a method of the present invention includes 1) collating and evaluating current reliability activities; 2) identifying opportunities to enhance these through the introduction of live data analytic methods; 3) developing new live data analytic methods by equipment type to take advantage of available diagnostic and process variable data; 4) creating live data analytics tools, based upon the new methods, utilizing, for example, PI process book or similar; and 5) developing a test program for these new methods to build confidence in their ability to detect and alert personnel to degradations in performance.

Figure 2:
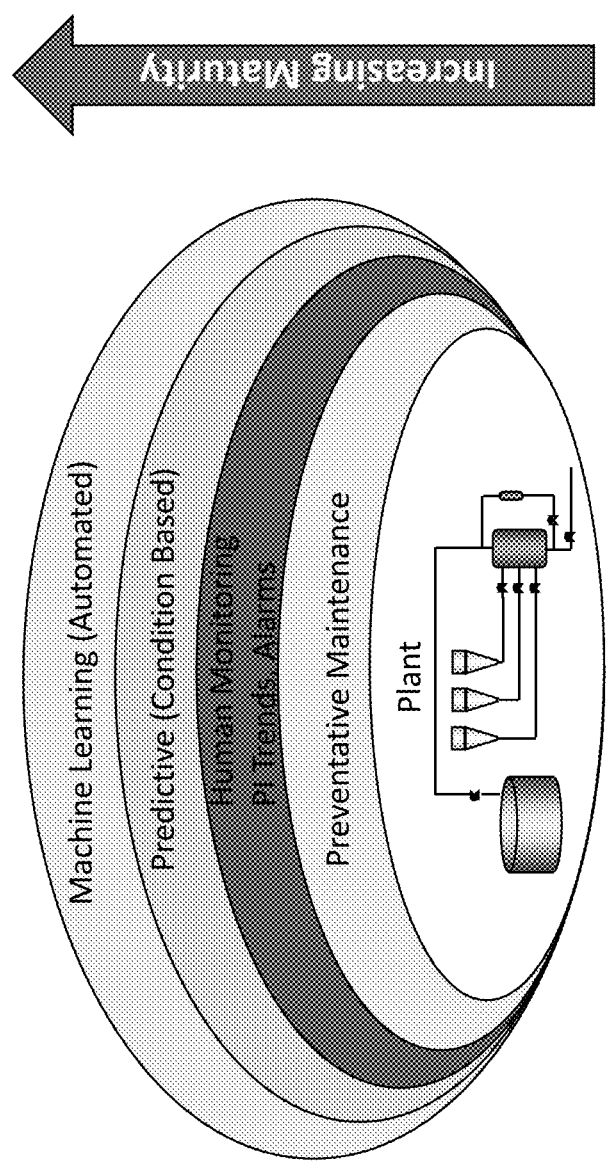
FIG. 2 is a diagram according to an embodiment of the present invention.

FIG. 2 illustrates how live data analytics (predictive and machine learning applications) is a recognizable contributor, with its own layers, to the reliability and performance of a plant facility. The adoption of data analytic techniques will become more mature over time and have a direct positive contribution to the reliability, uptime and performance of operating plants. Data analytic techniques will initially supplement and complement current maintenance and reliability activities but will, over time, supersede and replace these.

The predictive analytics tool generates a list of statistical anomalies around process data which need to be filtered in order to differentiate between those anomalies generated due to operational activities (maintenance, equipment switch over etc.) and those anomalies generated by equipment whose performance is deteriorating. In order to conduct this anomaly filtering, we will engage the services of both operational and engineering personnel who will be presented with a list of all anomalies on a daily basis. The operations and engineering personnel are, based upon their knowledge of ongoing activities and expected equipment performance, in the best possible position to conduct this activity. Having completed the daily anomaly filtering, technical investigations and/or corrective actions will be taken in order to prevent further degradation of equipment performance.

In support of the teachings herein, various analysis components may be used, including digital and/or analog systems. The digital and/or analog systems may be included, for example, in a processing device or system such as those described herein. The digital and/or analog systems may include components such as a processor, analog to digital converter, digital to analog converter, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The term "or" when used with a list of at least two items is intended to mean any item or combination of items.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of improving reliability of an industrial asset, the method comprising:
   collecting process variables associated with the industrial asset including one or more process variables selected from pressure, temperature, flow, position, level, speed, load, and differential pressure;
   generating a list of statistical anomalies from;
   filtering the statistical anomalies generated to operational activities or equipment performance;
   identifying patterns which may lead to corrective maintenance from said statistical anomalies generated by equipment whose performance is deteriorating;
   calculating a baseline using a time-weighted average over a standard average calculation;
   producing a color-coded scalable visualization of the industrial asset;
   collecting one or more real-time process variables and dividing by the time-weighted average for said process variable to provide a comparable value;
   placing the comparable value on the color-coded scalable visualization of the industrial asset;
   providing an aggregate single view that is scalable across the range of process variables of the industrial asset, wherein the aggregate single view visually represents all of the industrial asset; and
   identifying instrument failures in real-time.

2. The method of claim 1, wherein the color-coded scalable visualization updates in real-time.

3. The method of claim 1, wherein the color-coded scalable visualization is 3-D.

4. The method of claim 1, wherein the industrial asset is selected from the group consisting of: a facility, a machinery, an equipment, a hardware, a software, and any combination thereof.

5. A method of condition monitoring an industrial asset, the method comprising:
   collecting one or more of process variables associated with the industrial asset to generate process data including one or more process variables selected from pressure, temperature, flow, position, level, speed, load, and differential pressure;
   generating a list of statistical anomalies;
   filtering the statistical anomalies generated to operational activities or equipment performance;
   calculating a baseline using a time-weighted average over a standard average calculation;
   producing a color-coded scalable visualization of the industrial asset;
   collecting one or more real-time process variables and dividing by the time-weighted average for said process variable to provide a comparable value;
   placing the comparable value on the color-coded scalable visualization of the industrial asset;
   providing an aggregate single view that is scalable across different assets and a range of process variables of the industrial asset, wherein the aggregate single view visually represents all of the industrial asset; and
   identifying instrument failures in real-time.

6. The method of claim 5, wherein the color-coded scalable visualization updates in real-time.

7. The method of claim 5, wherein the color-coded scalable visualization is 3-D.

8. The method of claim 5, wherein the industrial asset is selected from the group consisting of: a facility, a machinery, an equipment, a hardware, a software, and any combination thereof.

9. A method of condition monitoring an industrial asset, the method comprising:
   collecting a plurality of process variables associated with the industrial asset to generate process data including one or more process variables selected from pressure, temperature, flow, position, level, speed, load, and differential pressure;
   generating a list of statistical anomalies;
   filtering the statistical anomalies generated to operational activities or equipment performance;
   calculating a baseline using a time-weighted average over a standard average calculation;
   producing a color-coded scalable visualization of the industrial asset;
   collecting one or more real-time process variables and dividing by the time-weighted average for said process variable to provide a comparable value;
   placing the comparable value on the color-coded scalable visualization of the industrial asset providing an aggregate single view that is scalable across a range of process variables of the industrial asset, wherein the aggregate single view visually represents all or a part or portion of the industrial asset; and
   identifying instrument failures in real-time.

10. The method of claim 9, wherein the color-coded scalable visualization updates in real-time.

11. The method of claim 9, wherein the color-coded scalable visualization is 3-D.

12. The method of claim 9, wherein the industrial asset is selected from the group consisting of: a facility, a machinery, an equipment, a hardware, a software, and any combination thereof.

* * * * *